US010134442B2

(12) United States Patent
Coqueret et al.

(10) Patent No.: US 10,134,442 B2
(45) Date of Patent: Nov. 20, 2018

(54) METHOD FOR SYNCHRONISING AND RENDERING MULTIMEDIA STREAMS

(71) Applicant: DEVIALET, Paris (FR)

(72) Inventors: Charles Coqueret, Paris (FR); Pierre-Emmanuel Calmel, Le Chesnay (FR); Alexandre Huffenus, Grenoble (FR)

(73) Assignee: DEVIALET, Paris (FR)

( * ) Notice: Subject to any disclaimer, the term of this patent is extended or adjusted under 35 U.S.C. 154(b) by 0 days.

(21) Appl. No.: 15/550,197

(22) PCT Filed: Feb. 10, 2016

(86) PCT No.: PCT/EP2016/052789
§ 371 (c)(1),
(2) Date: Dec. 20, 2017

(87) PCT Pub. No.: WO2016/128440
PCT Pub. Date: Aug. 18, 2016

(65) Prior Publication Data
US 2018/0122425 A1   May 3, 2018

(30) Foreign Application Priority Data

Feb. 10, 2015  (FR) ...................................... 15 51056

(51) Int. Cl.
*H04R 3/12* (2006.01)
*G11B 27/10* (2006.01)
*H04N 21/43* (2011.01)

(52) U.S. Cl.
CPC ......... *G11B 27/10* (2013.01); *H04N 21/4307* (2013.01); *H04R 3/12* (2013.01)

(58) Field of Classification Search
CPC .... H04N 21/243; H04N 21/434; H04N 21/81; H04R 27/00

(Continued)

(56) References Cited

U.S. PATENT DOCUMENTS

2004/0066801 A1   4/2004  Fujishiro et al.
2006/0161675 A1*  7/2006  Ducharme ....... H04N 21/23406
                                                           709/231

(Continued)

FOREIGN PATENT DOCUMENTS

JP   2008-118549   5/2008

OTHER PUBLICATIONS

International Search Report dated May 4, 2016 in International Application No. PCT/EP2016/052789.

*Primary Examiner* — Melur Ramakrishnaiah
(74) *Attorney, Agent, or Firm* — B. Aaron Schulman, Esq.; Stites & Harbison, PLLC

(57) ABSTRACT

The present invention concerns a synchronization method for synchronizing at least two systems for rendering multimedia streams, the method comprising:
the detection of a pulse of a same signal of fixed frequency by each rendering system and by a main clock system,
the generation of a main clock signal and a dependent clock signal,
the estimating of a main local date of reception of the subsequent pulse and a dependent local date of reception of the subsequent pulse,
the calculation of the difference between the main local date and the dependent local date,
the iteration of the preceding steps until a first condition concerning the calculated differences is met,
the receiving of a multimedia stream, by each of the rendering systems,
the sending of a rendering date, and
the calculation of an effective date for the rendering of the multimedia stream.

9 Claims, 3 Drawing Sheets

Figure 1:
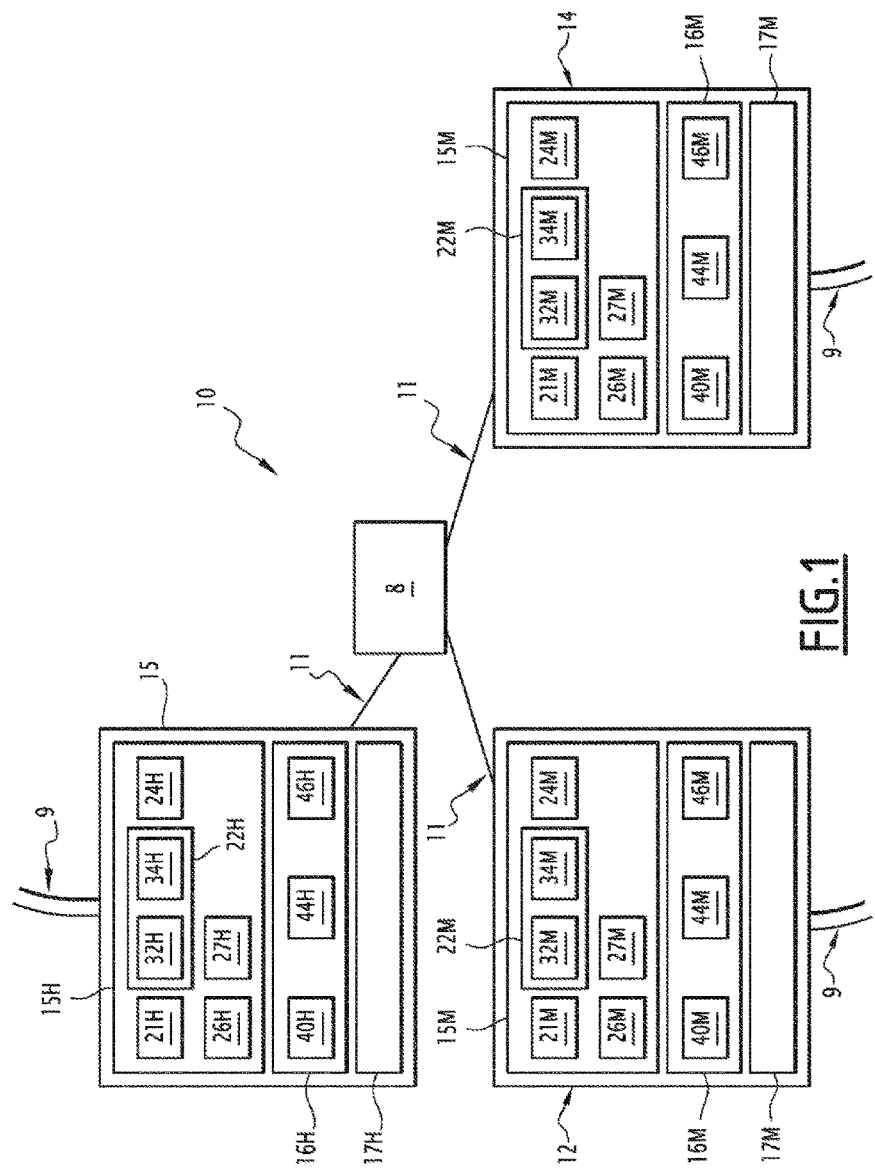

(58) Field of Classification Search
USPC .............................. 700/94; 375/259; 709/231
See application file for complete search history.

(56) References Cited

U.S. PATENT DOCUMENTS

2006/0233266 A1* 10/2006 Suetsugu ............... H04N 5/775
    375/259
2014/0294023 A1   10/2014 Leconte et al.
2015/0016476 A1    1/2015 Herzog

* cited by examiner

METHOD FOR SYNCHRONISING AND RENDERING MULTIMEDIA STREAMS

The present invention relates to a synchronisation method for synchronising at least two rendering systems for rendering multimedia streams.

The invention also relates to a rendering method for rendering multimedia streams by at least two rendering systems for rendering multimedia streams.

The invention further relates to an associated rendering installation.

The invention relates, in particular, to the field of speaker systems. A speaker system is a system that comprises one or more loud-speakers, for the acoustic reproduction of a sound from an electrical signal produced by an audio amplifier.

When multiple speakers are present in the same audio system, each speaker must reproduce the audio channel assigned to it simultaneously with the other speakers in order to avoid a lag between the sounds generated by each speaker.

For this purpose, the speakers are physically connected to the same amplifier.

However, when each speaker incorporates an amplifier and there is no physical synchronisation link present between the speakers, it is necessary to synchronise the clocks of each speaker amplifier in order to ensure that the speakers render the same sound at the same time.

A protocol that is known from the state of the art, is the Network Time Protocol that makes it possible to synchronise, via an information systems network, the local clock of computers on a time reference.

However, the synchronisation of the clocks achieved with such a protocol is not precise enough to synchronise the clocks of loudspeakers. Indeed, the synchronisation deviation is generally greater than 5 milliseconds (ms).

One of the objectives of the invention is to synchronise the clocks of rendering systems for rendering multimedia streams that are not physically connected to each other, in a precise manner, that is to say with a synchronisation deviation of less than 100 microseconds (μs).

To this end, the object of the invention relates to a synchronisation method for synchronising at least two rendering systems for rendering multimedia streams, one of the rendering systems being a main multimedia system and at least one of the rendering systems being a dependent multimedia system, the method comprising:
  the detection of a pulse of a same signal of fixed frequency by each rendering system and by a main clock system;
  the generation, based on the detected pulse, of a main clock signal by the main clock system, in order to form a main time base, and, by each rendering system, of a dependent clock signal in order to form a dependent time base;
  the estimation by the main clock system, based on the detected pulse and the main clock signal, of a main local date of reception of the subsequent pulse in the main time base, and by each rendering system, based on the detected pulse and the dependent clock signal of the said rendering system, of a dependent local date of reception of the subsequent pulse in the dependent time base of the said rendering system;
  for each rendering system, the calculation of the difference between the main local date of the main clock system and the dependent local date of the considered rendering system and storing of the calculated difference;
  For each rendering system, the iteration of the previous steps until a first condition concerning the differences calculated for the considered rendering system has been fulfilled;
  the receiving of a multimedia stream by each of the rendering systems;
  the sending, by the main multimedia system, at least to the dependent multimedia system, of a rendering date expressed in the time base of the main multimedia system, the rendering date being calculated based on the main clock signal and the differences calculated for the main multimedia system;
  the calculation, by each rendering system, in the time base of the considered rendering system, of an effective date of rendering of the multimedia stream based on the clock signal of the rendering system considered, the rendering date and the differences calculated for the rendering system considered.

According to particular embodiments of implementation, the synchronisation method comprises one or more of the following characteristic features, taken into consideration individually or in accordance with all technically possible combinations:
  the method comprises, for each rendering system, the calculation of a variance in/of the differences calculated for the rendering system considered, the first condition being fulfilled when the calculated variance is less than a predetermined threshold value;
  the predetermined threshold value is less than or equal to 100 microseconds;
  the method comprises, for each rendering system, the calculation of the average of the differences calculated, the effective date of the dependent multimedia system being equal to the difference between the rendering date received by the said dependent multimedia system and the average calculated for the said dependent multimedia system;
  the pulses originate from the domestic electric network;
  the main clock system is a rendering system for rendering multimedia streams;
  when at least one particular rendering system receives a multimedia stream that is different from the multimedia stream received by the main multimedia system, the method comprises the sending by the said particular dependent multimedia system, instead of the main multimedia system, of a date of rendering of the different multimedia stream, expressed in the time base of the said particular dependent multimedia system, to all of the dependent multimedia systems receiving the same different multimedia stream as the said particular dependent multimedia system.

The invention also relates to a rendering method for rendering multimedia streams by at least two systems for rendering multimedia streams, one of the rendering systems being a main multimedia system and at least one of the rendering systems being a dependent multimedia system, the method comprising:
  the synchronisation of the rendering systems by a synchronisation method as defined here above, and
  the rendering by each rendering system for rendering multimedia streams received on the effective date determined for each rendering system.

The invention also relates to a rendering installation for rendering multimedia streams comprising:
  at least two rendering systems for rendering multimedia streams, one of the rendering systems being a main multimedia system and at least one of the rendering systems being a dependent multimedia system; and a main clock system, the rendering systems and the main clock system being capable of operationally implementing a rendering method for rendering multimedia streams as defined above.

Figure 2:
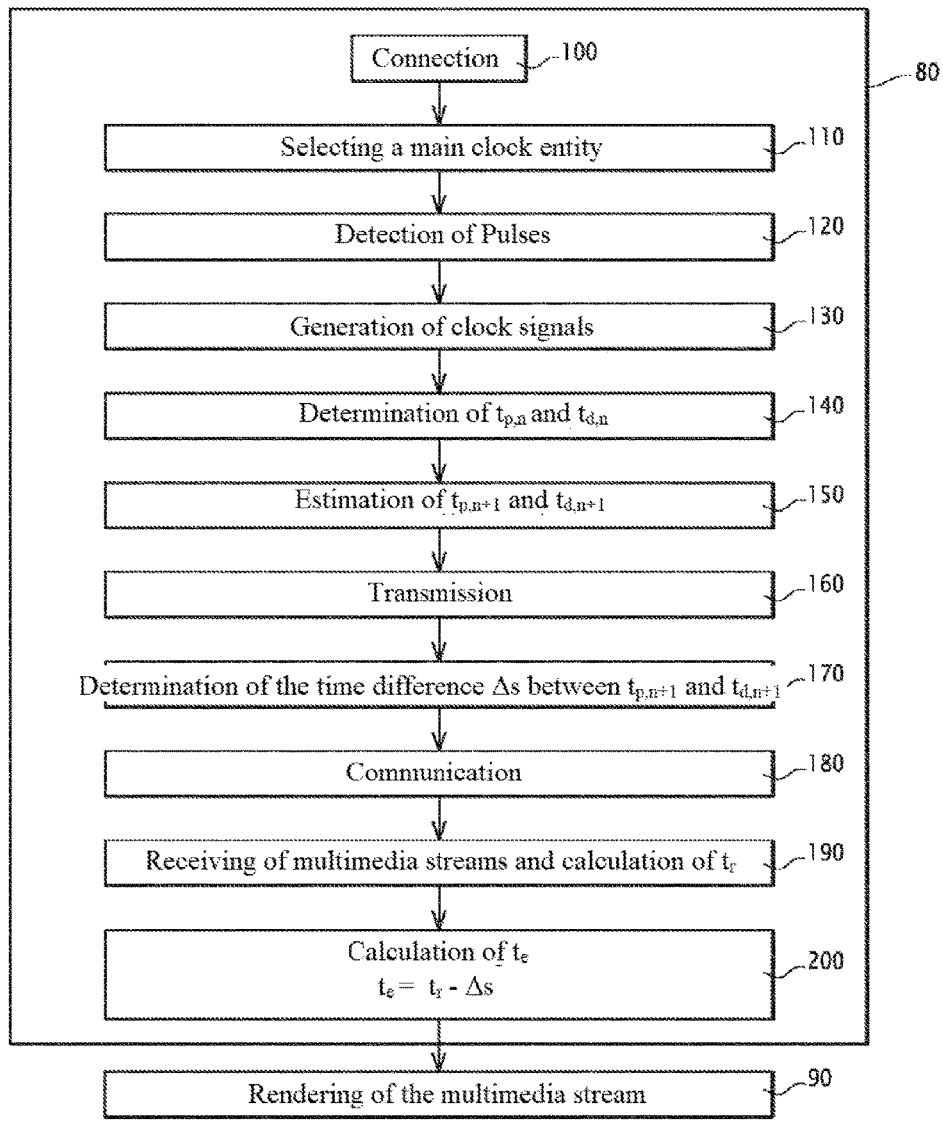
Figure 3:
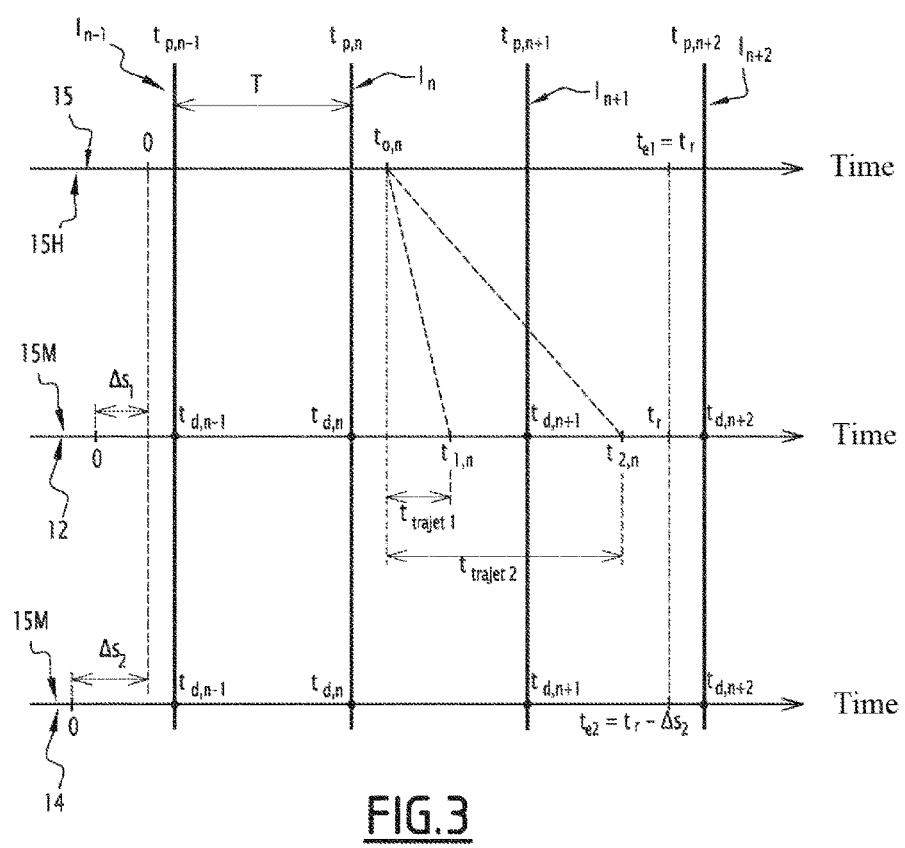

Other characteristic features and advantages of the invention will become apparent upon reading the description that follows of the embodiments of the invention, provided purely by way of non-limiting examples and with reference being made to the accompanying drawings in which:

FIG. 1 is a schematic representation of an electrical power grid, of transfer channels for transferring multimedia streams and a rendering installation for rendering multimedia streams according to the invention;

FIG. 2 is a flowchart of an exemplary implementation embodiment of a rendering method according to the invention, the method comprising a first synchronisation phase and a second rendering phase; and FIG. 3 is a diagram illustrating one time axis relative to a main clock signal, two time axes relative to two dependent clock signals, as well as the pulses emitted by the electrical power grid shown in FIG. 1.

Illustrated in FIG. 1, are a electrical power grid 8, transfer channels 9 for transferring multimedia streams and a rendering installation 10 for rendering multimedia streams supplied with power by the electrical power grid 8 and capable of receiving the multimedia stream coming from the channels 9.

The electrical power grid 8, is for example, the domestic power grid. The electrical signal generated by the electrical grid is a sinusoidal wave. The frequency of electrical signal generated by the electrical grid is, for example, 50 Hertz (Hz) or 60 Hz. In the following sections of the description, each portion of a sinusoidal signal delimited by two consecutive zero crossings of the sinusoidal signal is known as "pulse" or "pulsation". The period between two pulses from the grid is denoted as T.

The electrical power grid 8 is physically connected to the installation 10 via connecting cables 11.

The channels 9 are configured so as to route a multimedia stream to the installation 10. The multimedia stream is, for example, a sound or a video stream.

The channels 9 are physically connected to the installation 10, that is to say by means of wires.

By way of a variant, the multimedia stream is transmitted to the installation 10 according to a wireless transmission protocol in accordance, for example, with the standards of the group IEEE 802.11 (Wi-Fi) or the group IEEE 802.15 (Bluetooth).

The installation 10 comprises at least two rendering systems 12, 14 for rendering multimedia streams such that one of the rendering systems 12, 14 is a main multimedia system 12 and at least one of the rendering systems 12, 14 is a dependent multimedia system 14. The installation 10 further also comprises at least one reference clock system 15.

The rendering systems 12, 14 and the reference clock systems 15 are capable of interacting in order to effectively implement a rendering method for rendering multimedia streams according to the invention.

The reference clock systems 15 and the rendering systems 12, 14 are not connected to each other by physical links dedicated to the synchronisation of these systems.

The rendering systems 12, 14 are systems for rendering multimedia streams, for example, audio speaker systems. The main multimedia system 12 is selected arbitrarily from among all of the rendering systems 12, 14. Thus, the components of the main multimedia system 12 and of each dependent multimedia system 14 are identical. The main multimedia system 12 is capable of controlling the dependent multimedia systems 14.

The reference clock systems 15 are according to one principal embodiment, illustrated in FIG. 1, also rendering systems for rendering multimedia streams comprising of the same components as the rendering systems 12, 14. In this case, each of the reference clock systems 15 is a main multimedia system 12 or a dependent multimedia system 14.

By way of a variant, the reference clock systems 15 are the synchronisation management systems for managing the synchronisation of all of the rendering systems 12, 14 and are thus then not able to reproduce a multimedia stream. In this case, the reference clock systems 15 are different from the rendering systems 12, 14.

In the following sections of the description, the components of the main multimedia system 12 and of each dependent multimedia system 14 are referenced by the same numbers since such components are identical. The components of the rendering systems 12, 14 are, in particular, referenced by their respective number followed by the letter "M". The components of the reference clock systems 15, that are identical to the components of the rendering system 12, 14 are referenced by the same number as these components followed by the letter "H". For example, a component 10M of a rendering system 12, 14 will be referred as component 10H for the reference clock systems 15. The components of the dependent multimedia systems 14 and of the reference clock systems 15 being identical to the components of the main multimedia system 12, only the components of the main multimedia system 12 are described in the following sections.

In the example illustrated in FIG. 1, the installation 10 comprises two multimedia stream rendering systems 12, 14 such that one of the rendering systems 12, 14 is a main multimedia system 12 and one of rendering systems 12, 14 is a dependent multimedia system 14. Additionally the installation 10 further comprises, a reference clock system 15.

By way of a variant, the installation 10 comprises a plurality of dependent multimedia systems 14 and a plurality of reference clock systems 15.

As illustrated in FIG. 1, the main multimedia system 12 comprises a clock entity 15M, a multimedia entity 16M, and a communication entity 17M.

The clock entity 15M is capable of generating a clock signal. A clock signal is an oscillating electrical signal of fixed frequency which paces the actions of a circuit. One period of a clock signal is known as "clock cycle" or "clock pulse".

The clock entity 15M is capable of communicating with all the other clock entities 15M of the installation 10 via the communication entity 17M. The clock entity 15M is also capable of communicating with the multimedia entity 16M via the communication entity 17M.

As illustrated in FIG. 1, the clock entity 15M of the main multimedia system 12 comprises a pulse detection module for detecting pulsations 21M, a signal generation module for generating a clock signal 22M, a counter 24M for counting clock pulses, a calculation unit 26M and an analyser 27M for analysing the difference.

The detection module 21M is capable of being connected to the electrical power grid 8 via the connecting cables 11.

The detection module 21M is capable of receiving and detecting the pulsations of the signal originating from the electrical power grid 8. In particular, the detection module 21M is capable of detecting particular phases of the sinusoidal wave generated by the electrical power grid 8, advantageously the 0° and 180° phases, that is to say, the zero crossings of the electrical signal at the frequency 1/T. The zero crossing occurs every 10 milliseconds (ms) for a sinusoidal electrical signal of frequency 50 Hz and every 8 ms for an electric signal of frequency 60 Hz.

The detection module 21M is capable of transmitting the detected pulsations to the calculation unit 26M and to the generation module 22M.

The generation module 22M is capable of generating a clock signal from the pulsations detected by the detection module 21M.

The generation module 22M comprises an adjustable internal clock 32M and an electronic multiplier circuit assembly 34M.

The electronic multiplier circuit assembly 34M serves the purpose of increasing the frequency of the output signal of the generation module 22M relative to the frequency of the signal transmitted by the detection module 21M which is taken as the reference. The frequency of the output signal of the generation module 22M is equal to the frequency of the signal detected by the detection module 21M multiplied by a predefined coefficient, and the phase of the output signal of the generation module 22M is adjusted to that of the frequency of the signal detected by the detection module 21M.

The electronic circuit assembly 34M is, for example, a PLL (for Phase-Locked Loop). A PLL is an electronic circuit assembly that makes it possible to lock-in an output frequency on a multiple of an input frequency.

The electronic circuit assembly 34M provides the ability to generate, at the output of the generation module 22M, a high frequency clock signal, for example of a frequency equal to 10 Megahertz (MHz) from an input signal of lower frequency, for example equal to 100 Hz in the case of an electrical grid generating a sinusoidal signal of frequency 50 Hz. The input signal is, in fact, frequency doubled as compared to the frequency of 50 Hz of the electrical grid because one period of a sinusoidal wave comprises two zero crossings and therefore two pulses.

The counter 24M is capable of counting the clock pulses, that is to say the pulses generated by the generation module 22M.

The counter 24M is an electronic circuit comprising, for example, flip-flops and a combinatorial network.

The counter 24M comprises an integer variable that is able to increment by one with each clock pulse, that is to say, at each pulse of the clock signal, and an internal memory storage that is capable of storing the last value of the integer variable.

The counter 24M is capable of transmitting the value of the integer variable thereof to the calculation unit 26M upon each incrementing of the integer variable.

The calculation unit 26M is capable of determining the date of detection of the subsequent pulse $I_{n+1}$ from the power supply grid 8 by the detection module 21M in relation to a common time base.

The date determined by the calculation unit 26M of each rendering system 12, 14 is known as subsequent dependent local date $t_{d,n+1}$. In the case of a reference clock system 15, the date determined by the calculation unit 26H of the reference clock system 15 is known as subsequent main local date $t_{p,n+1}$. The term "date" is understood to refer to the time instant when an event had occurred, is occurring, or should occur in relation to a common time base. The common time base is, for example, the POSIX time or UNIX time. POSIX time is a measure of time relative to the number of seconds that have elapsed since 1 Jan. 1970, 00:00:00 UTC (Coordinated Universal Time), up to the event to be dated not counting leap seconds.

The rendering systems 12, 14 and the reference clock system 15 of the installation 10 have the same common time base, for example POSIX time.

The difference analyser 27M is capable of determining the time difference Δs between an origin of the clock signal generated by the reference clock system 15 and an origin of the clock signal generated by each rendering system 12, 14, each origin being defined in the common time base.

The multimedia entity 16M is capable of rendering a multimedia stream from a multimedia stream received by the multimedia unit 16M via the multimedia channels 9. The term "rendering of a multimedia stream" is understood to refer in particular to the fact that the multimedia stream, initially in the form of an analogue or digital signal, is converted into sound.

The multimedia entity 16M comprises a date associating module 40M for associating a date to the considered multimedia stream, an interpretation module 44M for interpreting the date associated with the considered multimedia stream and a rendering module 46M for rendering the multimedia stream.

The date associating module 40M is capable of receiving a multimedia stream originating from the channels 9. The date associating module 40M is capable of integrating in the metadata the information and data relating to the date on which the content of the multimedia stream is to be rendered. Metadata is data used to define or describe other data.

The interpretation module 44M is capable of interpreting the information pertaining to the date on which the content of the multimedia stream is to be rendered.

The rendering module 46M is capable of locally rendering the multimedia stream based on information and data interpreted by the interpretation module 44M.

The communication entity 17M is capable of communicating with the exterior, in particular with all of the rendering systems 12, 14 and all of the reference clock systems 15. For example, the communication entity 17M is capable of establishing communication via a wireless transmission protocol in accordance with the standards of the group IEEE 802.11 (Wi-Fi), or the group IEEE 802.15 (Bluetooth), or the group IEEE 802.15.4 (ZigBee), or even in accordance with a power line communication protocol (abbreviated as CPL).

According to one particular embodiment that is different from that described here above, the reference clock systems 15 have no multimedia entity 16H. The reference clock systems 15 are thus then unable to render a multimedia stream but ensure the synchronisation of the rendering systems 12, 14 based on their clock entities 15H and their communication entities 17H.

In the following sections of the description, it is assumed that the reference clock systems 15 are rendering systems for rendering multimedia streams.

The operation of the rendering installation 10 for rendering multimedia streams will now be described with reference to FIG. 2 which is a flowchart of an exemplary implementation embodiment of a rendering method for rendering multimedia streams according to the invention.

The rendering method for rendering multimedia streams comprises a first phase 80 of synchronisation of the rendering systems 12, 14. This first synchronisation phase is effectively implemented by a synchronisation method. The rendering method also comprises a second phase 90 of rendering of multimedia streams by the synchronised rendering systems 12, 14.

The synchronisation method comprises a first step 100 of connecting of each reference clock system 15 and of each rendering system 12, 14 to the power supply grid 8 via the connecting cables 11.

The connection step 100 is carried out by an operator.

The synchronisation method comprises, thereafter, a step 110 of selecting of a single clock entity 15H from among all of the clock entities 15H of the reference clock systems 15 when the installation 10 comprises at least two reference clock systems 15 and therefore at least two clock entities 15H. In the following sections of the description, the selected clock entity 15H is known as "main clock entity 15H" and the corresponding reference clock system 15 is known as "main clock system 15". The main clock entity 15H is arbitrarily determined. For example, the main clock system 15 is the first reference clock system 15 connected to the power supply grid 8. The reference clock systems 15 whereof the clock entity 15H was not selected are thus then deactivated and therefore are no longer used in the remainder of the method. Thus for the remainder of the method only the main clock system 15 related to the main clock entity 15H and the rendering systems 12, 14 are considered.

When the installation 10 comprises a single reference clock system 15, this reference clock system 15 is the main clock system 15.

When the reference clock systems 15 are the rendering systems 12, 14 for rendering multimedia streams, the main clock system 15 is selected from among all of these rendering systems 12, 14.

In the following sections of the description, the clock entities 15M of the rendering systems 12, 14, that are different from the main clock system 15, are also known as "dependent clock entities 15M".

The step of selecting 110 is effectively implemented by all of the reference systems 12.

The synchronisation method comprises, thereafter, a step 120 of detection of pulses, denoted as $I_{n-1}$, $I_n$, $I_{n+1}$, $I_{n+2}$ in FIG. 3, originating from the electrical power grid 8 by the main clock system 15 and by each rendering system 12, 14. The pulses are emitted at a regular period, that is to say at a fixed frequency. The pulse emission period is, for example, equal to 10 ms in the case where the electrical power grid 8 is the domestic electrical power grid of frequency 50 Hz. The period between two consecutive pulses $I_n$, $I_{n+1}$ emitted by the electrical power grid 8 is known as "period T of the pulses from the grid".

The detection step 120 is effectively implemented by the detection module 21M of the main clock system 15 and by the detection modules 21M of the rendering systems 12, 14.

Each detection module, respectively 21H, 21M, subsequently transmits the detected pulsations to the associated generation module, respectively 22H, 22M, and to the associated calculation unit, respectively 26H, 26M.

The synchronisation method subsequently comprises a step 130 of generation of a main clock signal and at least one dependent clock signal.

The signal generation step 130 comprises, for the main clock system 15, the multiplying of the frequency of the input signal, that is to say of the signal originating from the electrical power grid 8, in order to obtain a main clock signal. The multiplication is performed by the electronic multiplier circuit assembly 34H based on the detected pulses.

Similarly, the signal generation step 130 comprises, for each rendering system 12, 14, the multiplying of the frequency of the input signal, that is to say of the signal originating from the electrical power grid 8, in order to obtain a dependent clock signal. The multiplication is performed by the electronic multiplier circuit assembly 34H based on the detected pulses.

The main clock signal and each dependent clock signal have the same clock frequency, for example equal to 10 MHz. In this example, the number of clock pulses between two consecutive pulses of 50 Hz frequency from the domestic power grid is thus equal to $10^5$. The number of clock pulses between two pulses is related to a duration equal to the period T of the pulses from the grid.

The value of the clock frequency of each signal is transmitted to the corresponding calculation unit 26H, 26M.

The dependent clock signals are generally out of synch (not synchronised) with the main clock signal. The term "out of synch", is understood to indicate that the dependent clock signals do not have the same origin in the common time base as the main clock signal and therefore have different phases from those of the main clock signal. Thus, the main clock signal defines a main time base and each dependent clock signal defines a dependent time base.

FIG. 3 illustrates the time axis relative to the main clock signal generated by the main clock entity 15M and the time axes related to the dependent clock signal generated by each of the dependent clock entities 15M of the main multimedia system 12 and of the dependent multimedia system 14. The origins O of the main clock signal and of the dependent clock signal related to the main multimedia system 12 are shifted by a time difference $\Delta s_1$. The origins O of the main clock signal and of the dependent clock signal related to the dependent multimedia system 14 are shifted by a time difference $\Delta s_2$ The present method provides the means in particular to determine the time differences $\Delta s_1$ and $\Delta s_2$.

The signal generation step 130 is effectively implemented by the generation modules 22H and 22M.

The synchronisation method comprises, thereafter, a step 140 of determining, in the time base of the main clock system 15, the time instant of detection of the last pulse $I_n$ originating from the power supply grid 8 by the detection module 21H of the main clock system 15. The time instant determined in the main time base of the main clock entity 15H is known as "main local date $t_{p,n}$".

The step 140 also comprises the determination, in the time base of each rendering system 12, 14, of the time instant of detection of the last pulse $I_n$ originating from the electrical power grid 8 by the detection module 21M of the said rendering system 12, 14. The time instant determined in the dependent time base of each dependent clock entity 15M is known as "dependent local date t".

The local date of a clock entity 15H, 15M is the latest value of the integer variable of the counter 24H, 24M, of the clock entity 15H, 15M at the given time instant. The value of the integer variable is, in effect, related to a date defined in the common time base, for example POSIX time.

The synchronisation method comprises, thereafter, a date estimation step 150 for estimating the date of the subsequent pulse originating from the electrical power grid 8 which will be detected by the detection modules 21 H 21M.

The estimation step 150 comprises for the main clock entity 15M of the main clock system 15, the addition of the main local date $t_{p,n}$ and of the period T of the pulses from the grid in order to obtain a subsequent main local date $t_{p,n+1}$ expressed in the main time base. The subsequent main local date $t_{p,n+1}$ is the date, expressed in the main time base, of the occurrence of the subsequent pulse originating from the electrical power grid 8. The subsequent main local date $t_{p,n+1}$ is estimated by the main clock system 15.

In similar fashion, the estimation step 150 comprises, for the dependent clock entity 15M of each rendering system 12, 14, the addition of the dependent local date $t_{d,n}$ of the considered rendering system 12, 14 and of the period T of the grid in order to obtain a subsequent dependent local date $t_{d,n+1}$ expressed in the dependent time base of the considered rendering system 12, 14. The subsequent dependent local date $t_{d,n+1}$, for each rendering system 12, 14, is the date, expressed in the dependent time base of the considered rendering system 12, 14, of the occurrence of the subsequent pulse originating from the electrical power grid 8. The subsequent dependent local date $t_{d,n+1}$ is estimated by the rendering system 12, 14.

Illustrated in FIG. 3 are the pulses $I_{n-1}$, $I_n$, $I_{n+1}$, $I_{n+2}$ emitted from the electrical power grid 8, the main local date $t_{p,n}$ of the main clock entity 15H and the dependent local dates $t_{d,n}$ of the dependent clock entities 15M of the main multimedia system 12 and of the dependent multimedia system 14 upon the detection of the last pulse $I_n$. The date of the subsequent pulse $I_{n+1}$ estimated by the main clock entity 15M is $t_{p,n+1}$ and the date of the subsequent pulse $I_{n+1}$ estimated by each dependent clock entity 15M is $t_{d,n+i}$.

The estimation step 150 is effectively implemented, in particular, by the calculation unit 26M of the main clock entity 15M and by the calculation units 26M of the dependent clock entities 15M.

The synchronisation method comprises, thereafter, a transmission step 160 for transmitting the subsequent main local date $t_{p,n+1}$ expressed in the main time base to each of the dependent clock entities 15M. The transmission is performed by the communication entity 17M of the main clock system 15.

During the transmission step 160, the subsequent main local date $t_{p,n+1}$ is not transmitted instantly to the calculation unit 26M but with a lag time known as travel time $t_{travel}$. The travel time is variable and fluctuates over time.

As illustrated in FIG. 3, when the date of the subsequent pulse $t_{p,n+1}$ estimated by the main clock entity 15H is sent on the date $t_{0,n}$ and is received on the date $t_{1,n}$, the travel time $t_{travel1}$ is less than the period T between two consecutive pulses from the grid 8. In this case, the subsequent pulse is the pulse $I_{n+1}$ for the dependent clock entity 15M.

In contrast, when the date of the subsequent pulse $t_{p,n+1}$ estimated by the clock entity 15M is is sent on the date $t_{0,n}$ and is received on the date $t_{2,n}$ the travel time $t_{travel2}$ is greater than the period T between two consecutive pulses from the grid 8. In this case, the subsequent pulse is the pulse $I_{n+2}$ for the dependent clock entity 15M while the date sent by the main clock entity 15H is relative to the pulse $I_{n+1}$.

The synchronisation method comprises, thereafter, a determination step 170 of determining the time difference Δs between the origin of the main clock signal and the origin of each dependent clock signal, which is equal to the difference between the subsequent main local date $t_{p,n+1}$ of the main clock system 15 and the subsequent local dependent date $t_{d,n+1}$ of the considered rendering system 12, 14.

The determination step 170 comprises the receiving by each dependent clock entity 15M of the subsequent main local date $t_{p,n+1}$ sent by the main clock entity 15M and expressed in the main time base.

The determination step 170 comprises, for each dependent clock entity 15M, the calculating of the difference $\Delta_{n+1}$ between the subsequent main local date $t_{p,n+1}$ transmitted and expressed in the main time base and the subsequent dependent local date $t_{d,n+1}$ determined for the dependent clock entity 15M and expressed in the dependent time base. The difference $\Delta_{n+1}$ is calculated by the difference analyser 27M. The difference $\Delta_{n+1}$ calculated is then saved and stored in the memory unit of the difference analyser 27M.

The determination step 170 also comprises comparing the difference $\Delta_{n+1}$ calculated relative to a standard difference $\Delta_{standard}$ specific to each dependent clock entity $\Delta_{n+1}$ calculated for the considered dependent clock entity 15M. When the calculated difference $\Delta_{n+1}$ is lower than the standard difference $\Delta_{standard}$, the value of the standard difference $\Delta_{standard}$ is replaced by the value of the calculated difference $\Delta_{n+1}$ and the calculated difference $\Delta_{n+1}$ is considered to be "valid". Indeed, a difference that is greater than a previously calculated difference signifies that the travel time is higher than that of the standard difference $\Delta_{standard}$ and therefore that the date sent by the main clock entity 15H has potentially arrived after the pulse for which the subsequent main local date $t_{p,n+1}$ was estimated.

When the calculated difference $\Delta_{n+1}$ is greater than the standard difference $\Delta_{standard}$ the calculated difference $\Delta_{n+1}$ is considered to be "invalid".

The difference $\Delta_{n+1}$ is also calculated for the main clock entity 15H. In this case, the difference $\Delta_{n+1}$ is always zero because the calculation performed is the difference between the subsequent main local date $t_{p,n+1}$ and this same subsequent main local date $t_{p,n+1}$.

The determination step 170 subsequently comprises, for each dependent clock entity 15M and for the main clock entity 15H, the calculation of a variance of the set of valid and invalid difference values $\Delta_{n+1}$ in the memory of the corresponding analyser 27H, 27M. The maximum number of values stored in the memory is for example fixed at 1000, with the oldest values being progressively deleted and replaced with the new values of differences Δ.

When the calculated value of the variance V, for a dependent clock entity 15M, is lower than a predetermined threshold value, the synchronisation method comprises the calculation of the average of the N last valid values of differences. This averaged difference is known as "synchronised difference Δs". The synchronised difference Δs is, for each dependent clock entity 15M, the time difference between the origin of the main clock signal and the origin of the dependent clock signal generated by the dependent clock entity 15M. This synchronised difference Δs is saved and stored in the associated difference analyser 24H, 27M. The predetermined threshold value is greater than or equal to zero. For example, the predetermined threshold value is less than or equal to 100 microseconds (μs). The number N is, for example, equal to 100.

If not, the steps 120 to 170 are iterated until the calculated value of the variance V is lower than the predetermined threshold value.

Thus the calculation of the synchronised difference Δs does not take into account the invalid values of differences, which makes it possible to eliminate the differences calculated based on the subsequent main local dates $t_{p,n+1}$ that are received too late by the dependent clock entities 15M. Indeed, in the case of a long travel time, such as the time of travel $t_{travel2}$ illustrated in FIG. 3, the pulse $I_{n+2}$ is received before the arrival of the message containing the subsequent main local date $t_{p,n+1}$ of the pulse $I_{n+1}$. In this case, the calculated difference $\Delta_{n+1}$ is the difference between the main local date $t_{p,n+1}$ and the dependent local date $t_{p,n+2}$, which would skew the calculation of synchronised difference Δs if this difference value Δ were to be taken into account.

A synchronised difference Δs is also defined for the main clock system 15 whose value is zero.

In the case of the main clock entity 15M, the calculated variance value is zero, since the values of the differences are zero for the main clock entity 15M.

The synchronisation method comprises, thereafter, a communicating step 180 for communication between the clock entities 15H, 15M and the multimedia entities thereof, respectively 16H, 16M.

The communication step 180 comprises, in particular, the transmission of the main local date $t_{p,n}$ and the synchronised difference Δs of the main clock system 15 to the multimedia entity 16H of the main clock system 15.

The communication step 180 also comprises for each dependent clock entity 15M, the transmission of the dependent local date $t_{d,n}$ and of the synchronised difference Δs calculated for this dependent clock entity 15M to the associated multimedia entity 16M.

In the following sections, it is assumed that the main clock system 15 is a rendering system for rendering multimedia streams, that is distinct from the main multimedia system 12. The main clock system 15 is thus a dependent multimedia system 14.

By way of a variant, the main clock system 15 is the main multimedia system 12.

By way of yet another variant, the main clock system 15 is not a rendering system for rendering multimedia streams.

The synchronisation method comprises, thereafter, a multimedia reception and association step 190 for receiving multimedia streams by each multimedia entity 15H, 15M and for association of a rendering date $t_r$ with a portion of the multimedia stream, typically with the initial portion of the multimedia stream.

In the event the multimedia entity 16M of the main multimedia system 15 receives the same multimedia stream as all of the multimedia entities 15M of the dependent multimedia systems 14, a first rendering date $t_r$ is calculated in the time base of the main multimedia system 15 by the association module 40M of the multimedia entity 16M of the main clock system 15. The rendering date tr is calculated based on the main clock signal and the calculated differences $\Delta_{n+1}$ for the main multimedia system 12. The calculated rendering date $t_r$ is, thereafter, sent to all the dependent multimedia systems 14 that receive the same multimedia stream as the main multimedia system 15. In this case, the first rendering date $t_r$ is equal to the sum of a desired future main rendering date $t_{p,s}$ expressed in the main time base and the synchronised difference Δs of the main clock system 15. The desired future main rendering date $t_{p,s}$ is the sum of the date of the main clock entity 16M in the main time base at the time instant of calculation of the first rendering date $t_r$ and of a predetermined duration, for example equal to 40 ms. The desired future main rendering date $t_{p,s}$ is thus subsequent to the main local date $t_{p,n}$. The first rendering date $t_r$ is associated with a portion of the multimedia stream received by the multimedia entities 16M of the rendering systems 12, 14.

The first rendering date $t_r$ expressed in the time base of the main multimedia system 12 is then sent as metadata, with or without the multimedia stream, to the interpretation module 44M of the main clock system 15 and to the interpretation modules 44M of the dependent multimedia systems 14 via the communication entities 17M.

In the case where at least one multimedia entity 15M of a dependent multimedia system 14 receives a multimedia stream that is different from the stream received by the multimedia entity 16M of the main multimedia system 12, at least one other rendering date $t_r$ is calculated. The number of rendering dates $t_r$ calculated is equal to the number of different multimedia streams. Every other rendering date $t_r$ is calculated by summing a desired future dependent rendering date $t_{d,s}$ and the synchronised difference Δs of a dependent multimedia system 14 that receives the different multimedia stream. This dependent multimedia system 14 is then referred to as a particular dependent multimedia system 14 or particular system 14 in the following sections of the description. The desired future dependent rendering date $t_{d,s}$ is the sum of the date of the dependent clock entity 16M, of this particular system 14 in the dependent time base of this particular system 14 at the time instant of calculation of the rendering date $t_r$, and a predetermined duration, for example equal to 40 ms.

Each particular system 14 is selected arbitrarily from among all of the dependent multimedia systems 14 that receive the same multimedia stream that is different from the multimedia stream received by the main multimedia system 12. Each rendering date $t_r$, calculated for a portion of multimedia streams and expressed in the dependent time base of a particular system 14, is sent as metadata to the interpretation modules 44M of the particular system 14 and to the interpretation modules 44M of all the dependent multimedia systems 14 that receive the same multimedia stream as the said particular system 14.

For example, three multimedia streams are received by the installation 10: the first by the main multimedia system 12 and a first group of dependent multimedia systems 14, the second by a second group of dependent multimedia systems 14, and the third by a third group of dependent multimedia systems 14. The first rendering date $t_r$ is the sum of the desired future main rendering date $t_{p,s}$ and the synchronised difference Δs of the main multimedia system 12. The second rendering date $t_r$ is calculated by the association module 40M of one of the dependent multimedia systems 14 of the second group, selected arbitrarily, by summing the desired future dependent rendering date $t_{d,s}$ and the synchronised difference Δs of the dependent multimedia system 14 selected. The third rendering date $t_r$ is calculated by the date association module 40M of one of the dependent multimedia systems 14 of the third group, selected arbitrarily, by summing the desired future dependent rendering date $t_{d,s}$ and the synchronised difference Δs of the dependent multimedia system 14 selected.

The step of data reception 190 comprises, thereafter, the receiving of metadata containing the rendering time $t_r$, expressed in the time base of the main multimedia system 12 or of a particular system 14, associated with a portion of the multimedia stream by each of the interpretation modules 44M that receive the same multimedia stream as the system 12, 14 sending the metadata.

The synchronisation method comprises, thereafter, a step 200 of interpretation of the date on which the content of the multimedia stream is to be rendered locally by each multimedia entity 16H, 16M.

The step of interpretation 200 comprises the calculating of an effective date $t_e$ by each rendering system 12, 14, expressed in the time base of each considered system 12, 14, on which the multimedia stream is to be rendered locally by the multimedia entity 16H, 16M of the considered rendering system 12, 14. The effective date $t_e$ is calculated based on the clock signal of the considered rendering system 12, 14, the rendering date $t_r$ received by the system and the calculated differences Δ for the considered rendering system 12, 14.

For the main multimedia system 12, the effective date $t_e$ is equal to the difference between the rendering date $t_r$ received by the interpretation module 44M of the main multimedia system 12 and the synchronised difference Δs of this main multimedia system 12. Thus the effective date $t_e$ of the main multimedia system 12 is equal to the desired future main rendering date $t_{p,s}$ of the main multimedia system 12.

For each dependent multimedia system 14, the effective date $t_e$ is the difference between the rendering date $t_r$ transmitted to the interpretation module 44M of the multimedia entity and the synchronised difference Δs calculated for this dependent multimedia system 14.

In the case where the dependent multimedia system 14 is a particular system 14, the effective date $t_e$ calculated for this dependent multimedia system 14 is the difference between the rendering time $t_r$ and the synchronised difference Δs calculated for this particular system 14. Thus, the effective date $t_e$ of each particular system 14 is equal to the desired future dependent rendering date $t_{d,s}$ of this particular system 14.

For example, as illustrated in FIG. 3, the effective date $t_r$ is calculated by the main multimedia system 12 and is sent to the dependent multimedia system 14 and to the main clock system 15. The effective rendering date $t_{e1}$ of the main clock system 15 is equal to the rendering date $t_r$ received since the synchronised difference Δs is zero for the main clock system 15. The effective rendering date $t_{e2}$ of the dependent multimedia system 14 is equal to the difference between the rendering date $t_r$ received and the synchronised difference $Δs_2$ of this dependent multimedia system 14.

The second phase 90 of the rendering method for rendering multimedia streams, comprises the rendering of the multimedia stream locally by each multimedia entity 16H, 16M on the effective date $t_e$ calculated for each multimedia entity 16H, 16M. The multimedia stream is rendered with or without audio processing.

By way of a variant, the clock entity 15H of the main clock system 15 comprises a generator of internal pulsations in place of the pulse detection module 21M. The internal pulse generator is capable of emitting pulses at a fixed frequency, for example, set at 120 Hz. in this case the detection step 120 comprises the transmission of pulses generated by the internal pulse generator, on the one hand, to the generation module 21H, and to the calculation unit 26H of the main clock system 15 and, on the other hand, to the generation modules 21M and to the calculation units 26M of the rendering systems 12, 14. The other steps are identical.

By way of a further variant, the installation 10 comprises a mixed system in place of at least one of the reference clock systems 15. The mixed system is a system comprising the same components as the reference clock systems 15 with the difference being that the mixed system may possibly be used as a reference clock system 15 or as a rendering system 12, 14 that is distinct and separate from a reference clock system 15. In particular, the mixed system may be selected as the main clock system 15. However, when the mixed system is not selected as the main clock system 15, the mixed system is capable of operating as a rendering system 12, 14 that is distinct and separate from a reference clock system 15.

Thus, the rendering method and, in particular, the synchronisation method makes it possible to synchronise rendering systems for rendering multimedia streams such as speaker systems that are not physically connected to each other by synchronisation links. The selection of the predetermined threshold value in particular allows for more precise synchronisation of the systems of the installation 10. By choosing a predetermined threshold value that is less than or equal to 100 μs, the deviation in synchronisation between the systems of the installation 10 is less than or equal to 100 μs.

In addition, the rendering method provides the ability to synchronise the rendering of different multimedia streams by the set of systems 12, 14 in the installation 10. Thus, different sounds are able to be generated in a synchronous manner by the various different systems 12, 14 of the installation 10.

Indeed it will be well understood by the person skilled in the art that the first rendering date $t_r$ is equal to the sum of a desired future main rendering date $t_{p,s}$ expressed in the time base of the clock entity of the main multimedia system and the synchronised difference Δs of the said main multimedia system. The desired future main rendering date $t_{p,s}$ is the sum of the date of the clock entity of the said main multimedia system in the time base of the multimedia system at the time instant of calculation of the first rendering date $t_r$ and of a predetermined duration, for example equal to 40 milliseconds.

The invention claimed is:

1. A synchronisation method for synchronising at least two rendering systems (12, 14) for rendering multimedia streams, one of the rendering systems (12, 14) being a main multimedia system (12) and at least one of the rendering systems (12, 14) being a dependent multimedia system (14), the method comprising:

the detection (120) of a pulse (In) of a same signal of fixed frequency by each rendering system (12, 14) and by a main clock system (15), the generation (130), based on the detected pulse (In) of a main clock signal by the main clock system (15) in order to form a main time base, and, by each rendering system (12, 14), of a dependent clock signal in order to form a dependent time base;

the estimation (150) by the main clock system (15) based on the detected pulse (In) and the main clock signal, of a main local date (tp,n+1) of reception of the subsequent pulse (In+1) in the main time base, and by each rendering system (12, 14) based on the detected pulse (In) and the dependent clock signal of the said rendering system (12, 14) of a dependent local date (td,n+1) of reception of the subsequent pulse (In+1) in the dependent time base of the said rendering system (12, 14)

for each rendering system (12, 14), the calculation (170) of the difference (Δn+1) between the main local date (tp,n+1) of the main clock system (15) and the dependent local date (td,n+1) of the considered rendering system (12, 14) and the storing of the calculated difference (Δn+1);

for each rendering system (12, 14), the iteration of the previous steps (120, 130, 150, 170) until a first condition concerning the differences (Δn+1) calculated for the considered rendering system (12, 14) has been fulfilled, the receiving (190) of a multimedia stream by each of the rendering systems (12, 14);

the sending (190), by the main multimedia system (12), at least to the dependent multimedia system (14), of a rendering date (tr) expressed in the time base of the main multimedia system (12), the rendering date (tr) being calculated based on the main clock signal and the differences calculated (Δn+1) for the main multimedia system (12);

the calculation (200), by each rendering system (12, 14) in the time base of the considered rendering system (12,

14), of an effective date (te) of rendering of the multimedia stream based on the clock signal of the considered rendering system (12, 14), the rendering date (tr) and the calculated differences (Δn+1) for the considered rendering system (12, 14).

2. A synchronisation method according to claim 1, wherein the method comprises, for each rendering system (12, 14), the calculation (170) of a variance of the differences (Δn+1) calculated for the considered rendering system (12, 14), the first condition being fulfilled when the calculated variance is less than a predetermined threshold value.

3. A method according to claim 2, wherein the predetermined threshold value is less than or equal to 100 microseconds.

4. A method according to claim 1, wherein the method comprises, for each rendering system (12, 14), the calculation of the average (As) of the calculated differences (Δn+1), the effective date (te) of the dependent multimedia system (14) being equal to the difference between the rendering date (tr) received by the said dependent multimedia system (14) and the average (As) calculated for the said dependent multimedia system (12, 14).

5. A synchronisation method according to claim 1, wherein the pulses originate from the domestic electric network (8).

6. A synchronisation method according to claim 1, wherein the main clock system (15) is a rendering system (12, 14) for rendering multimedia streams.

7. A synchronisation method according to claim 1, wherein when at least one particular rendering system (14) receives a multimedia stream that is different from the multimedia stream received by the main multimedia system (12), the method comprises the sending by the said particular dependent multimedia system (14), instead of the main multimedia system (12), of a date of rendering (tr) of the different multimedia stream, expressed in the time base of the said particular dependent multimedia system (14), to all of the dependent multimedia systems (14) receiving the same different multimedia stream as the said particular dependent multimedia system (14).

8. A rendering method for rendering multimedia streams by at least two systems (12, 14) for rendering multimedia streams, one of the rendering systems (12, 14) being a main multimedia system (12) and at least one of the rendering systems (12, 14) being a dependent multimedia system (14), the method comprising:

the synchronisation (80, 100, 110, 120, 130, 140, 150, 160, 170, 180, 190, 200) of the rendering systems (12, 14) by a synchronisation method according to claim 1; and the rendering (90) by each rendering system (12, 14) of the multimedia streams received on the effective date (te) determined for each rendering system (12, 14).

9. A rendering installation (10) for rendering multimedia streams comprising:

at least two rendering systems (12, 14) for rendering multimedia streams, one of the rendering systems (12, 14) being a main multimedia system (12) and at least one of the rendering systems (12, 14) being a dependent multimedia system (14); and a main clock system (15);

the rendering systems (12, 14) and the main clock system being capable of implementing a rendering method for rendering multimedia streams according to claim 8.

\* \* \* \* \*